Oct. 13, 1970 P. N. KNISKERN 3,533,181
FISHING ROD ATTACHMENT
Filed Feb. 11, 1969 2 Sheets-Sheet 2
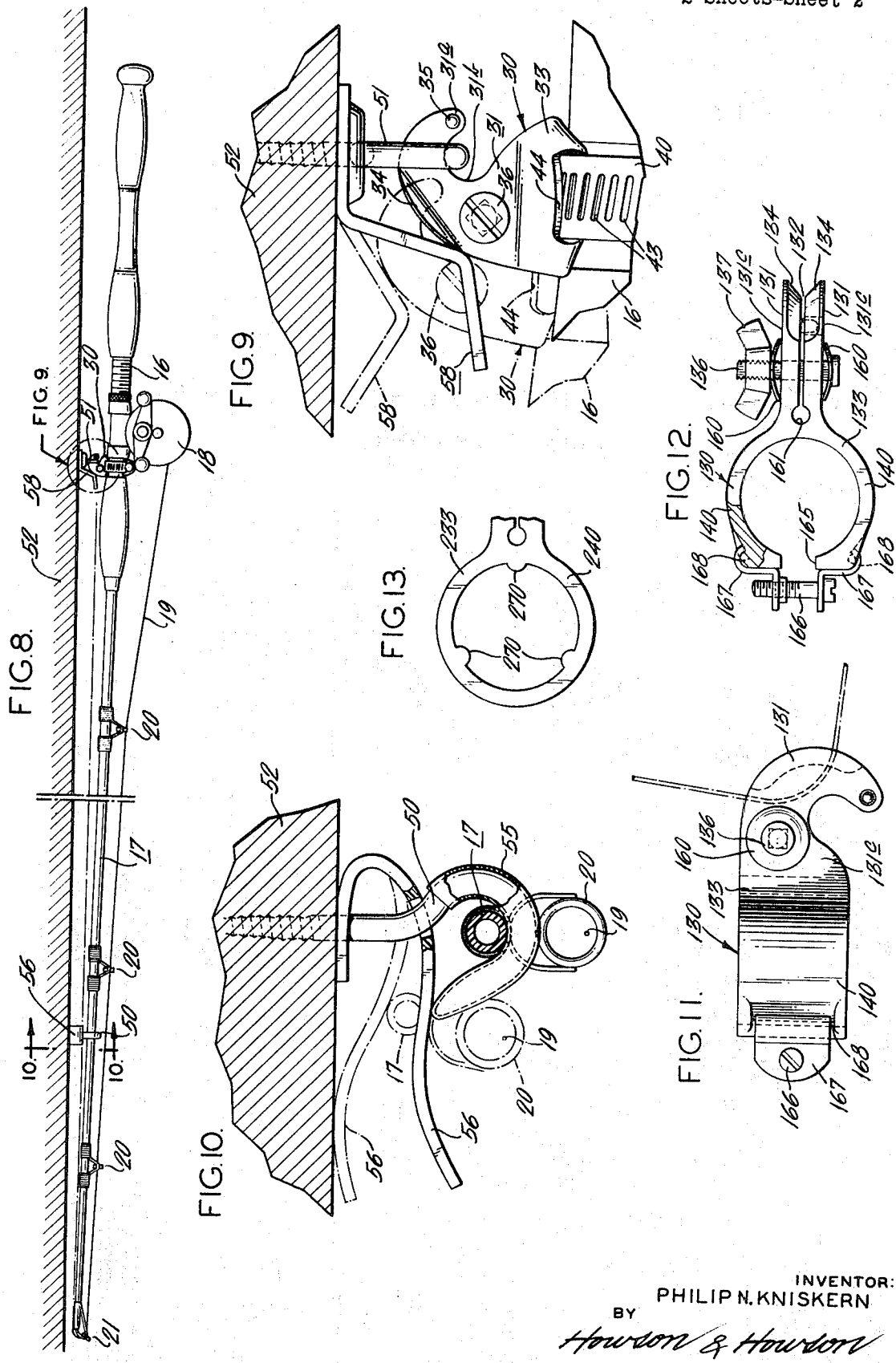
INVENTOR:
PHILIP N. KNISKERN
BY
Howson & Howson
ATTYS.

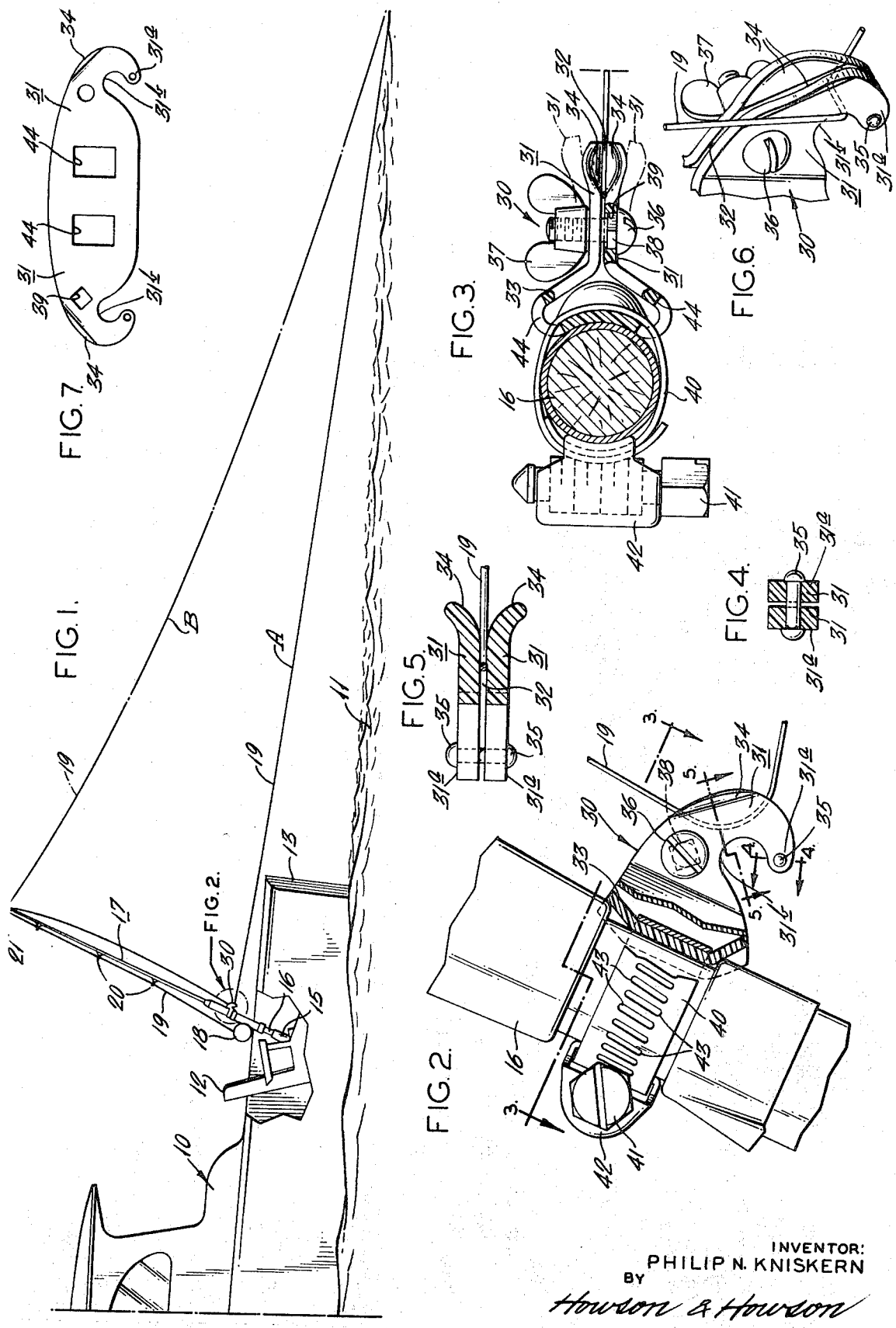

United States Patent Office 3,533,181
Patented Oct. 13, 1970

3,533,181
FISHING ROD ATTACHMENT
Philip N. Kniskern, Todmorden Farm,
Wallingford, Pa. 19086
Filed Feb. 11, 1969, Ser. No. 798,400
Int. Cl. A01k 87/00
U.S. Cl. 43—25          6 Claims

ABSTRACT OF THE DISCLOSURE

An attachment is provided for releasably securing a fishing line to the handle of a fishing rod while fishing. The attachment comprises a pair of plates disposed in spaced confronting relation for frictionally engaging the line in a slot therebetween so that the line may extend outwardly from the handle while trolling but may be released therefrom when a fish strikes to permit it to extend outwardly from the tip of the rod. In addition, the plates have a hook-shaped profile which cooperates with hanger means to securely support the rod in a suitable horizontal or vertical storage position when it is not in use.

---

The present invention relates to fishing-line-release devices, and more particularly, the present invention relates to line-release apparatus for use with a fishing rod to permit a fishing line to extend outwardly from alternate locations on the rod while fishing from a moving boat.

At present, it is customary for sport fishermen to troll long lengths of line from the tips of their rods as the boat from which they are fishing advances slowly through the water. When two or more lines are being trolled from the same boat however, there may be a tendency for the lines to tangle depending upon sea and weather conditions. This tendency may be reduced by manually holding the line against the handle of the rod and releasing the line therefrom when a fish strikes. If the line is released prematurely, the hook may be dislodged from the fish, and if the line is held too long, it may injure the fingers holding it. Thus it is desirable to provide apparatus which releasably holds the line under the proper tension. Heretofore, however, simple and inexpensive apparatus has not been available to perform this function.

In addition, there is not presently available line-release apparatus which also may be used with cooperating hanger means to securely store the rod in a suitable position when the rod is not in use or to safely secure fishing hooks to the rod when not used for fishing.

With the foregoing in mind, it is a primary object of the present invention to provide novel line-release apparatus for use with a fishing rod to permit a fishing line to extend selectively outward from either the tip or the handle of the rod while fishing.

It is another object of the present invention to provide compact and inexpensive line-release apparatus for use with a fishing rod.

As a further object, the present invention provides improved line-release apparatus having a hooked configuration which may be used to provide a substantially drag-free line-release device, and which may also be used with cooperating hanger means to securely store a fishing rod when the rod is not in use.

As a still further object, the present invention provides unique line-release apparatus having a hook-shaped configuration which may be used for safely securing hooks or lures to the handle of a fishing rod while not being used for fishing.

More particularly, the present invention provides simple line-release apparatus for use with fishing rod to permit a fishing line to extend outwardly from either the tip or the handle of the rod when fishing from a moving boat. The apparatus normally releasably clamps a length of the fishing line in a narrow slot formed between a pair of hook-shaped plates disposed in side-by-side confronting relation, the length of line being guided into the slot by lips on the plates which flare outwardly from the slot to form a tapered entrance thereinto. Threaded means interconnects the plates and is operable upon rotation in opposite directions to displace the plates toward and away from each other for varying the clamping pressure on the line and to thereby set the line-releasing force. In addition, mounting means secures the plates to the rod handle and disposes the hook bight of the plates toward the butt of the rod so that it may serve as a drag-free line-release when the line is looped around the bight. Furthermore, the plates may cooperate with hanger means to securely store the rod when it is not in use.

These and other objects, features and advantages of the present invention will become apparent from the following description when taken in conjunction with the accompanying drawings in which:

FIG. 1 is a side elevational view of line-release apparatus embodying the present invention shown mounted on a fishing rod, the view illustrating the apparatus in operation with a fishing line in full lines extending rearwardly therefrom, and in broken lines extending rearwardly from the tip of the rod afer the line has been released from the apparatus;

FIG. 2 is an enlarged view of the line-release apparatus of FIG. 1;

FIG. 3 is a sectional view taken along line 3—3 of FIG. 2 to illustrate a length of line disposed in clamping relationship between a pair of plates which are urged inwardly by threaded means from their normally diverging positions as shown in broken lines;

FIG. 4 is a sectional view taken along line 4—4 of FIG. 2 to illustrate pin means for interconnecting the plates at the point of their hook-shaped profiles;

FIG. 5 is a sectional view taken along line 5—5 of FIG. 2 illustrating the lips of the line-release apparatus flaring outwardly from the line-receiving slot between the plates;

FIG. 6 is a fragmentary perspective view similar to FIG. 2 showing the line looped around the bight of the hook to render the apparatus substantially drag-free;

FIG. 7 is a developed view of the line-engaging plates of one preferred embodiment of the present invention;

FIG. 8 is a side elevational view of the fishing rod of FIG. 1 illustrating the line-release apparatus of the present invention coopreating with hanger means for securely supporting the rod when it is not in use;

FIG. 9 is an enlarged view of a portion of the hanger means which supports the rod at its handle;

FIG. 10 is a sectional view taken alonge line 10—10 of FIG. 8 and showing another portion of the hanger means which supports the fishing rod adjacent to its tip;

FIG. 11 is a side elevational view of a modified embodiment of the line-release apparatus of the present invention;

FIG. 12 is an end view of the apparatus illustrated in FIG. 11; and

FIG. 13 is an end view of modified means for mounting the line-release apparatus on a fishing rod.

Referring now to the drawings, there is illustrated in FIG. 1 a boat 10 advancing leftward or forwardly through water 11 at a relatively slow speed, for example while trolling. One or more chairs 12 is suitably mounted adjacent to the stern 13, each chair 12 having a socket or pole holder 15 receiving the handle 16 (FIG. 8) of an upwardly and rearwardly projecting fishing rod 17. In some cases, pole holders may be provided in the gunwales or stern of the boat to thereby permit a series of lines to be troled from the same boat. A fishing reel 18 is mounted on the handle 16 of the rod 17, and a fishing line 19 stored on the reel 18 extends along the rod through a series of guides 20, 20 and rearwardly from a guide or tip 21 at the uppermost end of the rod 17.

As noted heretofore, it is desirable for a fishing line to extend outwardly from the handle of a fishing rod, as indicated in full lines at A in FIG. 1, when more than one person is trolling from a boat in order to reduce the tendency for the lines to tangle. When landing a fish however, the line should extend outwardly from the tip of the rod, as indicated in broken lines at B in FIG. 1. In accordance with the primary object of the present invention, apparatus is provided for securing a fishing line to the handle of a fishing rod while trolling and for releasing the line therefrom when a fish strikes to permit the line to extend outwardly from the tip of the rod for landing the fish.

To this end, line-release apparatus 30 (FIGS. 1, 2 and 3) is provided to secure the line 19 to the handle of the rod by friction until a pull or tug on the line overcomes the friction and releases it. As may be seen in FIGS. 2 and 3, friction is applied to the line 19 by a pair of hook-shaped plates 31, 31 which extend outwardly from an integral saddle 33 to define a narrow line-receiving slot 32 therebetween. The slot 32 is aligned with a plane through the axis of the rod by a curved seat on the saddle which mounts against the handle 16. In the present invention, the plates are resilient in a plane normal to the rod axis, so that when the line 19 is inserted in the slot 32, the plates resiliently engage the line to frictionally retain it therebetween. In addition, the plates and saddle are preferably of one-piece molded plastic construction which simplifies manufacturing and thereby reduces its cost.

In order to facilitate insertion of the line 19 between the plates 31, 31, each plate has a lip 34 (FIGS. 2 and 5) at its outer extremity which flares outwardly from the slot 32, the lips 34, 34 cooperating to form a smoothly tapered entrance into the slot 32. In addition, pin means 35 (FIGS. 4 and 5) interconnects the plates 31, 31 at the points 31a of the hooks to prevent the line from slipping between the plates and catching thereon when the line is inserted in the slot. Thus, with this arrangement, a fisherman may readily position the line in the apparatus by pinching the line against the rod at a location forward of the apparatus and swinging the free run of the line clockwise in the plane of the slot until it is properly disposed in the slot between the plates (FIG. 2).

The apparatus of the present invention may be adjusted to compensate for the normal drag applied to the line by such factors as lure size, boat speed or the like. This is effected in the present invention by adjusting the friction applied on the line by the plates, so that the line is only released by a force in excess of normal drag and sufficient to lodge the fish-hook in the fish. To this end, the plates are normaly biased outwardly away from each other, and threaded means, in the present instance a bolt 36 and a wingnut 37, extends across the slot 32 and interconnects the plates 31, 31, the threaded means being selectively operable upon rotation in opposite directions to effect displacement of the plates toward and away from each other. Thus, when the wingnut 37 is rotated clockwise (FIG. 3), the plates 31, 31 are displaced against their bias toward each other to increase the friction and the line-release setting. When the wingnut 37 is rotated counterclockwise, the plates 31, 31 are displaced by their bias away from each other to decrease the friction and the line-release setting. The bolt 36 is prevented from rotating when the wingnut 37 is rotated by a square boss 38 adjacent its head, the boss engaging in a mating aperture 39 in one of the plates 31 (FIG. 7). In addition the wingnut is prevented from loosening in use by a locking action applied thereto by the plates 31, 31, the locking action being effected by the outward bias of the plates (see FIG. 3).

In order to permit the line-release apparatus of the present invention to operate free from drag, the hook-shaped plates 31, 31 each have a bight 31b, 31b located inwardly of its point 31a, 31a and facing rearwardly away from the tip 21 and toward the rod-handle 16 (see FIGS. 2 and 13). Thus, as may be seen in FIG. 6, the line 19 may be looped around th bight 31b to permit it to extend rearwardly from the rod-handle when fishing. When it is desired to release the line from engagement with the bight, the rod may be swung upwardly and rearwardly through an arc, thereby permitting the looped line to disengage the bight and permitting the line to extend outwardly from the tip of the rod.

In addition to its line-releasing function, the apparatus of the present invention may be used to safely secure fishhooks to the rod while not being used for fishing, and, as will be more fully described hereinafter, to store the fishing rod when it is not in use. Thus, when a fishhook is disposed in the bight 31b and the line is tightened, the fishhook is secured in a safe location on the rod.

The line-release apparatus of the present invention may be used satisfactorily with a range of fishing rod sizes. For this purpose, adjustable means is provided to mount the friction plates on rods having handles of various diameters. In the embodiment of FIGS. 2 and 3, the mounting means comprises a strap 40 which surrounds the rod-handle 16 and passes through a pair of slots 44, 44 in the saddle 33 (see FIG. 7). The strap 40 is secured to the handle 16 by a locking member 42 having an operator 41, the locking member 42 engaging in a series of transverse slots 43, 43 in the strap. Clockwise rotation of the operator 41 tightens the strap, and counterclockwise rotation of the operator loosens the strap permitting the apparatus to be slipped rearwardly along the handle, for example when it is desired to remove it from the rod (see FIGS. 2 and 3).

As an additional advantage, the line-release apparatus of the present invention may be used with cooperating hanger means for securely storing the rod in a horizontal position when the rod is not in use. As may be seen in FIG. 8, the hanger means comprises a latched hook 50 for supporting the rod adjacent its tip and an eyehook 51 for engaging the line-release apparatus to support the rod adjacent to its handle, the hooks being screwed into a horizontally disposed member 52, for example a timber on boat. As may be seen in FIG. 10, the hook 50 carries a resilient tongue 56 which is normally closed as seen in full lines and which may be opened to receive the rod 17 as seen in broken lines. In addition, the hook 50 has a cover 55 to protect the rod from damage. The eyehook 51 carries a resilient S-shaped clip 58 on its shank, and, as may be seen in full lines in FIG. 9, the clip 58 engages the lips 34, 34 of the line-release plates 31, 31 and biases the rod rightward to seat the eyehook 51 in the bight 31b of the plates. The rod 17 is thereby securely locked in place. When it is desired to use the rod, it may be disengaged from the eyehook 51 by displacing it leftward. Thus, the inclined lips of the plates cam the clip 58 leftward against its bias permitting a fisherman to use his other hand to simultaneously unlatch the hook 50 adjacent the tip of the rod.

If desired, modified line-release apparatus 130 in accordance with the present invention may be provided. Referring to FIGS. 11 and 12, the modified apparatus comprises a pair of hook-shaped plates 131, 131 projecting outwardly side-by-side from an integral saddle 133 to define a line-receiving slot 132 therebetween, the line being guided into the slot 132 by a pair of beveled surfaces 134, 134. Similarly to the embodiment of FIG. 2, a square-shanked bolt 136 interconnects the plates 131, 131 and carries a wingnut 137 which may be selectively rotated in opposite directions to adjust the slot width and hence the line-release setting. In this embodiment, a fine line-release adjustment is provided by resilient means, in the present instance spring washers 160, 160, disposed between the bolt head and wingnut and the opposite outer sides $131c$, 131c of the plates 131, 131. In addition, an aperture 161 at the base of the plates 131, 131 functions to provide a hinge to facilitate inward and outward displacement of the plates upon rotation of the wingnut in opposite directions.

In order to mount the apparatus 130 on a rod, the saddle 133 has integral straps 140, 140 forming a split 165 diametrically opposite to the plates to permit the straps to open for mounting around the rod-handle. The saddle is secured to the rod by a threaded fastener or bolt 166 which spans the split 165 and which interconnects a pair of clamps 167 engaging protrusions 168 on the straps, the saddle being tightened upon rotation of the bolt 166 in the proper direction.

The structure of the modified line-release apparatus may be further simplified for use with a fishing rod in which its handle disconnects from its flexible portion. For this type rod, a saddle 233 (FIG. 13) having a continuous strap 240 may be provided in lieu of the straps 140, 140 for mounting the plates on the rod. This arrangement does not have a wide range of adjustability. Thus, each rod size would require a particular strap size. A limited amount of adjustability is provided however, by a series of lugs 270, 270 spaced apart around the inner periphery of the strap to engage a rod-handle. Of course, with this arrangement, the strap 240 must be sufficiently flexible to permit its inward deflection between the lugs when it is slid onto the handle.

In view of the foregoing, it should now be apparent that simple and inexpensive line-release apparatus has now been provided which may also be used with cooperating hanger means to securely store a fishing rod when the rod is not in use.

While preferred embodiments of the present invention have been described in detail, various modifications, alterations or changes may be made without departing from the spirit and scope of the present invention as defined in the appended claims.

What is claimed is:

1. For use with a fishing rod having a line passing through its tip, line-release apparatus mountable on the rod at a location remote from the tip for frictionally engaging the line to permit it to extend outwardly from said location on the rod until a predetermined pull on the line effects release thereof and permits the line to extend outwardly from the tip, the apparatus comprising: a pair of resilient plates disposed in spaced confronting relation to define therebetween a narrow slot for receiving said line, said plates having lips diverging outwardly from said slot to define a smoothly tapered entrance for guiding said line thereinto and having a hook-shaped profile curving rearwardly to a point for defining a bight inwardly of said point, pin means interconnecting said plates at said point to limit the displacement of said line in said slot for preventing said line from snagging on said point, means interconnecting said plates for adjusting the spacing of said plates to set said predetermined pull, and means for mounting said plates on said rod at said remote location, whereby the line may extend outward alternatively from said tip and said remote location on the rod while fishing.

2. Apparatus in accordance with claim 1 including a saddle integral with said plates and having a curved rod-engaging seat for aligning said slot with a plane through the axis of the rod when mounted thereon, whereby insertion of the line into operative position in the slot is facilitated.

3. Apparatus in accordance with claim 2 wherein said resilient plates are biased away from each other outwardly from said saddle, and said interconnecting means comprises a threaded bolt extending through said plates and threadedly carrying a wingnut, said wingnut being disposed adjacent one outer side of the plates and said bolt having its head disposed adjacent the other outer side thereof, whereby a locking action is applied to the bolt and wingnut by the resilient bias of the plates.

4. Apparatus in accordance with claim 3 including resilient means carried by said bolt and engaging an outer side of the plates, whereby a fine adjustment of the line-release setting may be effected upon rotation of the wingnut.

5. Apparatus in accordance with claim 1 wherein said bight faces rearwardly away from said tip, so that a drag-free line-release is provided when the line is looped around the bight.

6. Apparatus in accordance with claim 1 including hanger means cooperable with said hook-shaped plates for supporting the rod in a storage position, said hanger means comprising: a hook for receiving the rod inwardly of its tip, an eyehook for engaging said plates in said bight, and a clip carried by said eyehook and biased toward its eye for engaging said lips and urging said plates into seating engagement therewith, whereby the rod may be secured in a storage position when it is not in use.

References Cited

UNITED STATES PATENTS

| 2,730,830 | 1/1956 | Smith | 43—25 |
| 3,199,242 | 8/1965 | Holmstrom | 43—25 |

FOREIGN PATENTS

| 1,267,839 | 6/1961 | France. |

WARNER H. CAMP, Primary Examiner